Oct. 23, 1951  JOHN P. FRANCESCO  2,572,022
NOW BY JUDICIAL CHANGE OF NAME
JOHN PATSY FRANCIS
LOCKING RIVET
Filed July 25, 1947

Inventor

*JOHN P. FRANCIS*

By D. C. Snyder
Attorney

Patented Oct. 23, 1951

2,572,022

UNITED STATES PATENT OFFICE 2,572,022

LOCKING RIVET

John P. Francesco, Haverhill, Mass., now by judicial change of name John Patsy Francis Application July 25, 1947, Serial No. 763,709

12 Claims. (Cl. 85—3)

(Granted under the act of March 3, 1883, as amended April 30, 1928; 370 O. G. 757)

This invention relates in general to a locking rivet and is more particularly described as a stay rivet adapted to be inserted from one side of a plate when the other side of the plate or the inner end of the rivet is not accessible.

Important objects of the invention are to provide a locking rivet which may be inserted from one side of a plate or article through an opening therein, with means to project outwardly at the other side of the plate or article to engage the back thereof, and when the rivet is drawn up at the side from which it is inserted, to clamp the rivet thereto, and to clamp a plurality of plates or articles together when the rivet is inserted through openings in a plurality thereof.

A further object of the invention is to provide a sealing plug or rivet for a plate or tank, to close an opening therein, or to prevent a leak, by applying the plug or rivet from the outer side of the plate or tank.

A further object of the invention is to provide a rivet of the class described which may be applied from one side only of a plate or other article in locking or clamping relation thereto, and may be removed, withdrawn or disengaged from the same side.

Other objects of the invention will appear in the specification and will be apparent from the accompanying drawings, in which.

Rivets of this class are used for attachment to and pressing together plates, bars, channels, and the like; for sealing leaks through openings in tanks, barrels and other containers; as an anchorage for cables and the like, on walls, floors, bulkheads and tanks; and to secure signs, hangers, and other articles to walls or to surfaces of other supports in which the rivets are applied from one side thereof.

This invention comprises a simple plug and a sleeve in which it is insertable, with arms secured to the plug and openings in the sleeve through which the arms extend in locking position.

Figure 1:
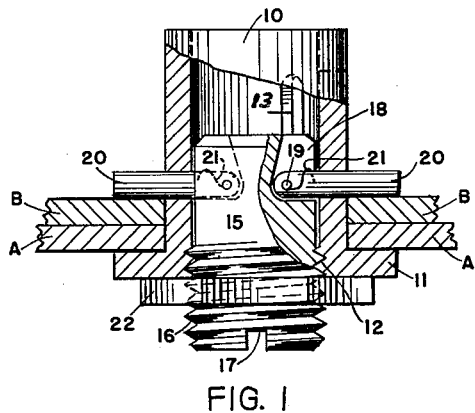
Fig. 1 is a sectional elevation of a locking rivet in accordance with this invention applied in clamping relation to two plates.
Figure 2:
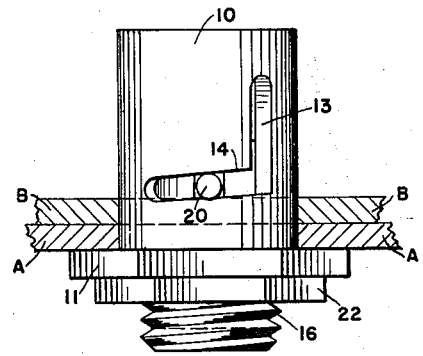
Fig. 2 is an elevational view of the rivet at an angle to the view in Fig. 1.
Figure 3:
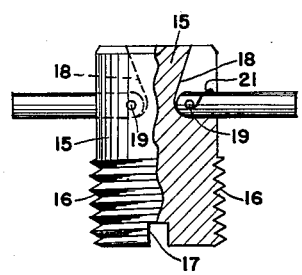
Fig. 3 is an elevational view, partly in section, of the locking plug.

Referring now more particularly to the drawings, a rivet sleeve 10, as shown in Figs. 1 and 2, has a flange 11 at one end, and internal threads 12 at this end. In opposite sides of the sleeve are longitudinal slots 13 each having a lateral extention 14 wedgingly inclined at slightly more than a right angle from its slot 13 and in the direction of the flange 11. These wedging extensions 14 are located at the proper distance from the flange 11 to receive therebetween the plates or other material to which the rivet is applied.

A rivet plug 15 has outside threads 16 at one end adapted to engage the inside threads 12 of the sleeve, and may be adjusted therein by a screwdriver engaging in end slot 17. Mounted in suitable opposite recesses 18 upon pivot pins 19 are locking arms 20, each pressed outwardly by a spring 21 engaging the pivot pin and extending over the arm. Each arm will swing from a position within the inner periphery of the sleeve 10, through one of the slots 13, to a position substantially at right angles to the plug. In this latter position the plug may be turned in the sleeve which will move the arms in the wedgingly inclined portions 14 until they engage the inner surface of a plate or other members through which the rivet is applied.

As shown in Figs. 1 and 2, the rivet sleeve 10 is inserted through holes in two plates A and B until the flange 11 engages the outer or exposed surface of the side from which the rivet is applied. The plug 15 is inserted or moved in the sleeve until the locking arms 20 will swing outwardly under the action of spring 21 through the slots 13 and may be rotated in the sleeve in the wedging slot extensions 14. These arms will engage the inner surface of the inner plate B and the plates may be drawn up tightly between the flange 11 and the arms 20, or the rivet may be tightly secured to the plates. A nut 22 may be applied to the threaded portion of the plug which projects outwardly from the sleeve, and against the flanged end of the sleeve for securing the plug tightly in clamping position and in the sleeve.

Figure 4:
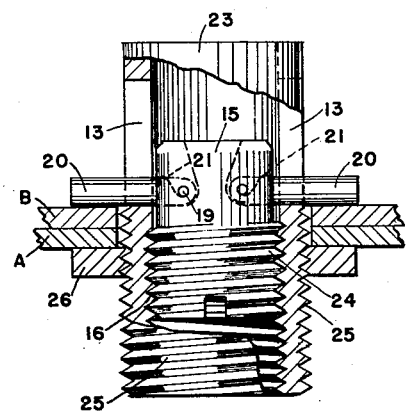
Fig. 4 illustrates a modification of the invention in which the rivet sleeve does not have an integral outer flange.
Figure 5:
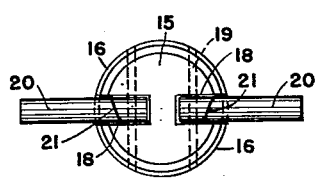
Fig. 5 is a top view of the plug shown in Fig. 3.

The construction described is satisfactory where the plates or other materials to be engaged are of a substantially fixed thickness, so that the distance between the flange and the wedging extension 14 of the slot, but where the rivet may be applied to materials of different thicknesses, the fixed flange may be omitted, and as shown in Fig. 4, a rivet sleeve 23 may be provided with inside threads 24 and outside threads 25, and one or more nuts 26 may be applied to the outside threads. The rivet plug 15 is movable within the sleeve, the arms 20 are swung outwardly by springs 21 through slots 13, they are turned in extensions 14, as previously described, and the nuts 26 engage the sleeve, operating as an adjustable flange instead of being fixed.

To withdraw the rivets, each plug 15 is first rotated in its sleeve to rotate arms 20 out of the wedging extensions 14 until they may be swung inwardly through the slots 13 against the springs 21. In the form shown by Figs. 1 and 2, the sleeve 10 must then be moved bodily outward by pulling it through the materials by means of the flange 11, which will press the arms 20 inwardly against the tension of the springs 21. Likewise in the form shown by Fig. 4, the arms after being backed out of engagement with the wedging extensions 14, may be swung inwardly within slots 13 by pulling the sleeve 23 bodily outward.

With these constructions the locking rivets may be applied to various materials, of different thicknesses, from one side only of the materials. The rivets are quickly applied and removed, and may be used for binding different articles together or the rivets may be firmly attached from one side of the articles for use as a stay or support.

As a plug or seal for openings in plates, tanks, and the like, the flange 11 is drawn up tightly against the outer surface of a material to which the rivet is applied, and the inside of the sleeve is tightly sealed by the plug and the nut 22. In the form shown by Fig. 4 the nut seals the outside of the sleeve by its contact with the outside of the material to which the rivet is applied, the inside of the sleeve is sealed by the plug. In both forms, washers or gaskets of metal or rubber are commonly inserted between the contacting surfaces, in a well known manner, and depending upon the substances to be sealed or contained. If the rivet is simply used as a stay or fastener, no washers may be needed.

While preferred forms have been described in some detail they should be regarded as examples and illustrations and not as restrictions or limitations of the invention, as various changes may be made in the construction, combination and arrangement of the parts without departing from the spirit and scope of the invention.

The invention described herein may be manufactured and used by or for the Government of the United States of America for governmental purposes without the payment of any royalties thereon or therefor.

I claim:

1. A locking rivet adapted to be applied from one side of an article, comprising a rivet sleeve with opposite longitudinal openings each having a lateral wedging extension at more than a right angle therefrom, a rivet plug movable in the sleeve, and locking arms pivoted to the plug, movable within the sleeve, and adapted to swing outwardly through the said openings and to be engaged in the extensions thereof when the plug is rotated in the sleeve.

2. A locking rivet adapted to be applied through a hole from one side of an article, comprising a sleeve with inside threads and opposite longitudinal slots with lateral locking extensions each disposed at an obtuse angle therefrom, a rivet plug threaded to move on the sleeve threads, and locking arms pivoted at opposite sides of the plug, movable with the plug in the sleeve, and movable outwardly through the slots and into engagement with the locking extensions when the plug is rotated after the arms extend through the slot.

3. A locking rivet adapted to be applied from one side of an article, comprising a sleeve with opposite slots having lateral locking extensions each disposed at slightly more than a right angle therefrom, a rivet plug movable in the sleeve having locking arms hinged thereto to swing from a position within the sleeve and through the opposite slots and into the said extensions when the plug is rotated, and means engaging the outside of the sleeve for securing it in position at one end against the outer side of an article through which the rivet is inserted.

4. A locking rivet adapted to be applied from one side of an article, comprising a sleeve with outside means at one end to engage the side of an article from which it is applied, the sleeve having opposite slots with lateral locking extensions extending obtusely at an angle to the slots and partly around the sleeve, a rivet plug movable in the sleeve having locking arms hinged thereto movable to swing from a position in the sleeve through the slots and into the extensions when the plug is turned and into wedging engagement with the back of an article to which the rivet is applied.

5. A locking rivet comprising a sleeve adapted to be inserted through an opening in an article from one side thereof and extending beyond the other side of the article, the sleeve having opposite longitudinal slots with lateral inclined locking extensions therefrom of slightly more than a right angle in the portion which extends beyond the other side of an article, means at the end of the sleeve for limiting the insertion from said one side of an article, and a rivet plug movable in the sleeve having locking arms hinged thereto movable to swing from within the sleeve through the slots into the extensions and movable rotatably with the plug within the extensions into clamping engagement with the back of an article to which the rivet is applied.

6. A locking and sealing rivet for a hole to which it is applied from one side of an article, comprising a sleeve adapted to be inserted into the hole, means at one end of the sleeve to abut the side of the article and to seal the sleeve in the hole, the sleeve having opposite longitudinal slots and lateral locking extensions thereof at an angle inclined to the side of the article and beyond the other side of the article when the sleeve is inserted in the hole, and a rivet plug having arms hinged thereto and movable by the plug through the slots into the extensions and in clamping engagement against the other or rear side of the article, and the plug being threaded within the sleeve to seal the inside of the sleeve.

7. A locking and hole sealing rivet comprising an internally threaded sleeve adapted to be inserted at one end through the hole in an article, means at the other end of the sleeve for abutting and sealing the outside of the sleeve against fluid flow from the article, the sleeve having opposite slots with connected lateral locking extensions at an obtuse angle therefrom, and a clamping plug threaded into the sleeve having arms hinged thereto and movable through the slots into the extensions thereof, the arms being movable with the plug when it is rotated upon the threads to engage the rear side of the article, and the arms being thus operative to clamp the rivet against the front and rear faces of an article, and the plug sealing the inside of the sleeve against fluid flow.

8. A locking rivet comprising an internally threaded sleeve with an outer flange at one end and opposite longitudinal slots with connected lateral locking extensions at an angle inclined therefrom toward but spaced from the flange, a plug externally threaded at one end to fit the threads of the sleeve and having opposite recesses in the other end, and arms hinged in the recesses and movable to pass within the sleeve, to rotate outwardly through the slots, and to engage in said extensions when the plug is turned in the sleeve.

9. A locking rivet comprising a sleeve internally and externally threaded at one end and having opposite longitudinal slots near the other end with connected lateral locking extensions from the inner ends of the slots at an angle thereto inclined toward the threaded end, a plug threaded at the outside of one end and having locking arms hinged in the other end to swing from a position within the sleeve, through the slots, and into the extensions when the plug is turned in the sleeve, and means threaded on the outer threads of the sleeve to provide an adjustable abutment.

10. A locking rivet, comprising a sleeve with longitudinal slots and connected laterally inclined wedging extensions at a slightly obtuse angle therefrom, a rivet plug movable in the sleeve having locking arms pivoted in the plug, the arms being movable within the sleeve and adapted to swing outwardly through the slots and movable in the extensions, and spring means attached to the plug and engaging the arms tending to swing them outwardly through the slots, the arms movable in the wedging extensions and through the slots by rotating the plug within the sleeve.

11. A plug for a locking rivet sleeve movable within the sleeve and having opposite recesses opening at the sides and end of the body, an arm pivoted in each recess and of a length to extend outwardly from the plug at the end thereof to be contained within the sleeve and to swing outwardly at the sides of the plug, and spring means engaging the plug and each of the arms tending to swing them outwardly from the ends and into the recesses at the sides of the plug.

12. A locking rivet comprising a sleeve internally and externally threaded at one end and having opposite longitudinal slots near the other end with connected lateral locking extensions from the inner ends of the slots at an angle thereto inclined towards the threaded end, a plug threaded at the outside of one end, and movable on the threads of the sleeve, and locking arms hinged in the other end of the plug to swing from a position within the sleeve through the slots and into the extensions when the plug is turned in the sleeve.

JOHN P. FRANCESCO.

REFERENCES CITED

The following references are of record in the file of this patent:

UNITED STATES PATENTS

| Number | Name | Date |
|---|---|---|
| 476,362 | Breisch | June 7, 1892 |
| 1,169,635 | Grimes | Jan. 25, 1916 |
| 1,433,410 | Passaner | Oct. 24, 1922 |
| 2,132,284 | Bohham | Oct. 4, 1938 |
| 2,207,507 | Douglas | July 9, 1940 |
| 2,223,273 | Slessman | Nov. 26, 1940 |
| 2,377,086 | Lang | May 29, 1945 |
| 2,402,813 | Harada | June 25, 1946 |
| 2,408,560 | Keehn | Oct. 1, 1946 |

FOREIGN PATENTS

| Number | Country | Date |
|---|---|---|
| 381,591 | Italy | July 13, 1940 |